Oct. 10, 1967  J. H. CHAPMAN ETAL  3,346,418
METHOD OF PURIFYING PARTICULATE SOLID MATERIALS
Filed Nov. 15, 1963
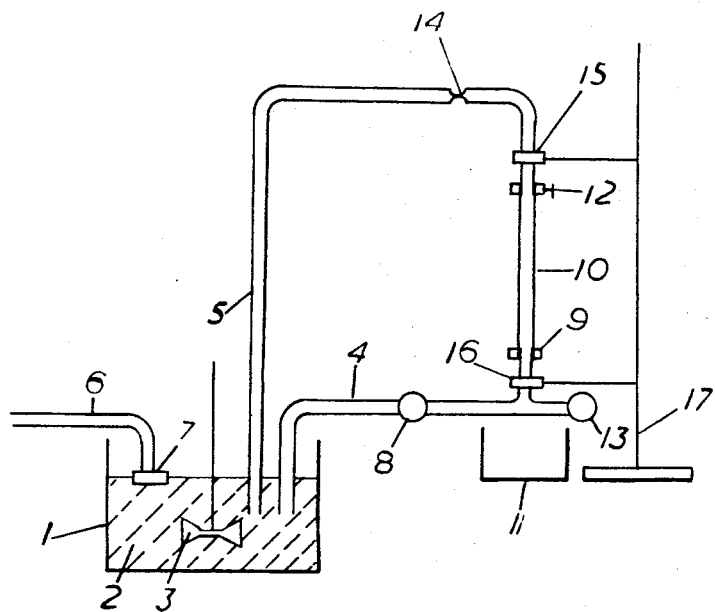
Inventors
JOHN HAROLD CHAPMAN
MAURICE VICTOR STANLEY EMM
By Bacon & Thomas
Attorneys 3,346,418
METHOD OF PURIFYING PARTICULATE SOLID MATERIALS
John Harold Chapman, Ruislip, and Maurice Victor Stanley Emm, Rickmansworth, England, assignors to Glaxo Laboratories Limited, Greenford, England, a British company
Filed Nov. 15, 1963, Ser. No. 324,122
Claims priority, application Great Britain, Nov. 20, 1962, 43,876/62
21 Claims. (Cl. 134—25)

This invention is concerned with improvements in or relating to the separation of solid particles from a liquid medium, such separation being of use, for example, in the purification and/or concentration of the particles or in the purification of the medium.

Considerable practical difficulties are encountered when it is desired to purify certain materials of small particle size such as china clay, mineral-bearing clays, certain pigments and dyestuffs and finely divided catalyst supports such as alumina. Such materials are thus frequently subjected to a washing treatment with water or other liquid solvent for the impurities. The material may be produced as a suspension in a solvent or may be suspended in a solvent for the purpose of purification. The conventional techniques then involve removal of the liquid phase containing the impurities in solution, for example by filtration or centrifugation.

While various finely divided materials can readily be separated from a liquid phase as is known there are many which are difficult to filter or centrifuge. For example, certain finely divided materials form, even in a quite thin layer, a relatively impervious barrier to the flow of liquid and are thus difficult to filter or centrifuge. Such materials may be for instance clay-like, e.g. china clay or jelly-like as in the case of hydrated alumina.

In the case of such materials, further washing cannot conveniently be performed on a layer of material formed by filtration or centrifugation and the cake has to be removed from the filter or centrifuge and redispersed in fresh solvent. This is laborious and time-consuming. Moreover, owing to the large volume of solution retained by the cake of materials of this kind the filtration (or centrifugation) and resuspension must be carried out many times before the impurities are reduced to an appropriately low level. Dialysis is an alternative procedure but is very slow.

In addition to the finely divided materials referred to above, there are also other materials which, although not necessarily finely divided, are apt to cake in an irreversible manner during conventional filtration operations to provide an unworkable material. Particles encapsulated with gelatin, for example, cake in this way and, while the filter cake so formed is by no means impervious nevertheless it is in general useless for further processing.

It is therefore one object of the present invention to provide a method of washing finely divided or other materials having a tendency to cake, particularly those such as alumina of a gelatinous character, that is simple and economical to operate. It is a further object of the invention to provide a method which is useful for the separation of solid particles in general from a liquid medium.

The present invention is based upon our finding that if one passes a liquid carrying solid particles sufficiently rapidly over a porous surface, a thin layer only of the material forms on the porous surface which is able to act as a filter medium, the rate of passage of the liquid however preventing the building of a layer of material of such a thickness that caking occurs to a substantial extent, even in the case of hydrated alumina, particles encapsulated with gelatin and the like.

The invention accordingly provides a method of effecting separation of solid particles from a liquid medium, which method comprises rapidly passing the liquid medium carrying the particles over a porous surface whereby liquid medium passes through the surface and a thin layer of the particles is formed and maintained on the surface and acts as a pervious filter medium.

The method according to the invention is conveniently adapted to the purification of the liquid/solid system, the liquid medium being a solvent for impurities present. In such a method the liquid is advantageously continuously recycled over the porous surface until the desired degree of purity of the material has been attained, the volume of liquid being maintained by addition of fresh liquid. Alternatively, the method may be adapted to the concentration of the particles in the liquid, the passage of the liquid through the porous surface being arranged to effect the concentration and no fresh liquid being added.

The porous surface is preferably provided by a porous tube through which the particle carrying liquid is passed whereby a thin layer of the particles is maintained on the wall of the tube.

The method according to the invention is particularly suitable for the purification and/or concentration of hydrated alumina. It has been found that by using the method according to the invention it is possible to purify hydrated alumina to a sufficient degree to render it suitable for incorporation in injectable solutions or suspensions for use in medicine, particularly vaccines.

It will be appreciated that the method according to the invention can also be adapted to the purification of the liquid medium. Thus the liquid medium which passes through the porous surface has been filtered free from the particles carried therein. This may be particularly advantageous in biological processes, for example the removal of mycelium from fermentation liquors.

When the method of the invention is adapted to the purification of solid particles, the solvent used will depend upon the nature of the particulate material to be purified and also the nature of the impurities. It should be one in which the material to be purified is substantially insoluble but in which the impurities are soluble. The present method is of particular value for the washing of water-insoluble material with water but can equally be applied to washing with other solvents such as alcohols, ketones, ethers, esters, hydrocarbons etc.

The invention further provides an apparatus suitable for use in the method according to the invention which comprises a porous surface and means for rapidly passing a liquid carrying solid particles over the porous surface under pressure whereby in operation liquid medium passes through the porous surface and a thin layer of particles of the solid is formed and maintained on the surface and acts as a pervious filter medium.

The apparatus is preferably adapted to function continuously whereby the liquid medium carrying the solid may be continuously recycled over the porous surface. The apparatus also conveniently includes a reservoir and means for rapidly passing the liquid from the reservoir over the porous surface and back to the reservoir. Thus the liquid is preferably pumped from a reservoir through the porous tube and back to the reservoir again, for example, via a return pipe. Losses of solvent by passage through the porous tube may be made up by addition of fresh solvent to the reservoir if so desired; if losses are not made up in this way, then concentration of the solid in the liquid may be effected.

It is convenient for some purposes to provide the reservoir with a constant level device so that the volume of liquid is maintained constant. The porous surface may be provided with means for collecting the liquid passing through the surface.

The ratio of liquid medium to finely divided material should be so selected that the liquid remains fluid, since in some cases, particularly that of hydrated alumina suspensions, the particle carrying liquid tends to set if the ratio of solvent to solids is too low. For alumina of the type used in vaccine preparations, the concentration of solids should be below about 4%, and about 1% is preferred.

In purification methods the degree of purity of the solid and/or liquid may be estimated either continuously or by removing samples. When the impurities being removed consist of an electrolyte, as is the case with alumina, the electrolyte concentration of the liquid may be estimated by conductivity measurements, for example, by using a conductivity meter which may be used continuously to measure the conductivity of the liquid in the reservoir.

The porous surface is advantageously provided by a porous tube through which the liquid carrying the solid may be passed. The tube may if desired be of circular cross-section, but in general it is often advantageous to decrease the cross-sectional area of the tube while retaining the same surface area of wall within the tube by flattening of the tube. Alternatively, a central rod or the like may be introduced into the tube to reduce the volume through which the liquid must be made to flow. These arrangements reducing the cross-sectional area of the tube are an aid to achieving rapid flow rates of liquid through the tube. Other alternative arrangements are possible. For example, the porous tube can be enclosed by a solid tube through which the liquid can be passed, the liquid medium filtering inwards from the annular space.

The porous surface is conveniently of nylon cloth, but surfaces of other synthetic fibres, such as polyesters (e.g. Terylene) are also suitable. Alternatively, surfaces of porous metals, porous ceramics, porous plastics and metal gauzes may be used. Cloth tubes may be provided with external supports e.g. wire mesh, etc. The pore size of the material forming the porous surface must of course be such as to retain the thin layer of the finely divided material during operation of the process.

The rate at which the liquid carrying the solid is passed through the porous tube is important and must be high enough to prevent the building up of a layer of solid material thick enough so as substantially to prevent the passage of liquid through the walls of the tube. One method of combining a high linear flow velocity and a large surface area is to employ tubes of small diameter, i.e. about 0.65–2.5 cms., preferably about 1.27 cms. Flow rates of about 400 cms./sec. for a tube of 1.27 cms. diameter have been found to be satisfactory for aluminium hydroxide of high surface area (as used in the preparation of vaccines). Other methods involve the use of flattened tubes and tubes with a central rod or core as described above. Ribbed tubes may also be employed for the purpose.

In the case of very fine particles which are of substantially smaller diameter than the pores of the porous surface (for example barium sulphate particles with a nylon cloth) it may be advantageous to commence circulation of the liquid at a relatively low velocity. It has been found that, where a high initial velocity is used, in some cases very fine particles may tend to be carried through the porous surface with the liquid. In such cases if low velocities are initially used, however, the particles are retained in the pores of the porous surface and the velocity may then be increased until rapid flow is achieved.

For a given particle carrying liquid and porous surface, it has been found that there is generally a value of the mean velocity gradient which gives best results. Thus, for example, in circular tubes of nylon cloth used for separating hydrated alumina of high surface area (as used in the preparation of vaccines) from a suspension in water, we have found that the mean velocity gradient (by which we mean the mean linear velocity of the liquid in the tube divided by the radius of the tube) is advantageously about 650 sec.$^{-1}$. This enables the preferred velocity for a tube of any given diameter to be calculated.

The rate at which the liquid medium passes through the porous surface depends to some extent upon the average pressure difference between the two sides of the porous surface. When porous tubes are used, a suitable pressure within the tube, for example using a suspension of hydrated alumina, has been found to be 2.8 kg./sq. cm. In general, the average pressure within the tube will be less than 5.0 kg./sq. cm. and will normally be between 1.0 and 3.0 kg./sq. cm. depending on the nature of the particles in the liquid.

For the purpose of illustration, a preferred embodiment of the apparatus according to the invention suitable in particular for the washing of hydrated alumina is shown in the accompanying schematic drawing, in which the single figure is a sectional elevation of the apparatus.

The apparatus shown in the drawing comprises a reservoir 1 containing an aqueous suspension 2 to be washed and a stirrer 3. The reservoir is provided with an outlet pipe 4, a return pipe 5 and a supply pipe 6. The supply pipe 6 is controlled by a constant level device 7. The outlet pipe 4 is provided with a pump 8 and a pressure gauge 13 and is connected to the lower end of a porous filtering member tube 10, by a screw clip 9. The return pipe 5 is connected to the upper end of the porous tube 10 by a screw clip 12 and provided with a constricted portion 14. Outlet pipe 4 and return pipe 5 are supported by clamps 15 and 16 mounted on a stand 17. A collecting vessel 11 is provided to receive suspension medium passing through the walls of tube 10.

A cloth suitable for formation of the tube 10 is for example a nylon cloth according to the following specification:

Construction: Twill weave with 60 denier yarn in both warp and weft, using a continuous filament nylon yarn heat set under pressure.

Final thread count: 254 per inch warp; 180 per inch weft.

Weight of cloth: 4 ounces per sq. yd. (135 gms./sq. meter).

In operation, the suspension 2 is withdrawn from the reservoir 1 through the outlet pipe 4 by means of the pump 8 which passes the suspension under pressure through the porous tube 10 and the suspension is returned to the reservoir 1 by means of the return pipe 5. Since some water passes through the pores of the porous tube 10 (and is collected in the vessel 11), the total volume is maintained by adding fresh water through the supply pipe 6, the constant level device 7 maintaining a constant level of water in the reservoir 1. The constricted portion 14 serves to increase the pressure within the tube.

The stirrer 3 in the reservoir 2 serves to ensure proper mixing of the suspension during operation of the process.

When the desired degree of purity of the suspension has been reached, the solvent may be removed, if desired, by any convenient method, for example by filtration, centrifugation, evaporation, spray drying, etc. However, as is frequently the case, particularly with hydrated alumina for use in vaccines, it may be desired to isolate the purified product in the form of a suspension. If desired, the suspension may be conveniently concentrated by cutting off the supply of solvent to the constant-level device and continuing to circulate the suspension.

For the better understanding of the invention we now give by way of illustration only examples of the operation of the method according to the invention:

*Example 1*

50 l. of a suspension of hydrated alumina containing about 1.2% $Al_2O_3$ and 0.5 N of electrolyte (mainly ammonium sulphate), was diluted to 75 l. with water and circulated in apparatus as shown in the accompanying drawing. The porous tube was 1.27 cm. in diameter and 186 cm. long, the flow rate 35 l./min. and the pressure shown on the gauge 2.7 kg./sq. cm.

After 2.5 hours the electrolyte concentration had fallen to 0.02 N, the desired level, and the flow of fresh water to the reservoir was cut off. After a further 0.5 hour the volume had fallen to 50 l. and the process was stopped.

*Example 2*

215 g. of barium sulphate, with a uniform particle size of about 10µ, were prepared by addition of hot barium hydroxide solution to hot ammonium sulphate solution.

The total volume was then made up to 2.50 l., and the suspension pumped through a nylon hose 0.63 cm. in diameter and 31 cm. in length, the inlet pressure being 2.4 kg./sq. cm. and the flow rate 8.4 l./min. The filtrate contained a high proportion of barium sulphate and showed no sign of becoming clear after 10 minutes. On reducing the flow rate to 2 l./min. the filtrate became completely clear, and a filtration rate of 0.036 l./min. was obtained. The filtrate then remained clear when the flow rate was steadily increased to 8.4 l./min.

In this example, therefore, it was essential to operate at a low flow rate initially, before circulating at the normal working rate, in order, apparently, to allow a filter-bed to form in the walls of the hose.

*Example 3*

A 7% w./v. suspension of sodium ferrigluconate in 75% aqueous methanol solution was prepared by adding glucono-δ-lactone solution to ferric chloride solution, and then adding sufficient sodium hydroxide solution to raise the pH value to a steady value of 7.5. The aqueous solution was then poured into 3 volumes of methanol.

This produced a clay-like suspension of sodium ferrigluconate from which the removal of sodium chloride by conventional procedures was tedious and unsatisfactory.

The suspension was pumped through a circuit containing a nylon hose, 0.63 cm. in diameter and 46.5 cm. in length, at a flow rate of 6.0 l./min. and an inlet pressure of 1.85 gm./sq. cm. A clear filtrate was obtained immediately, and the steady filtration rate was 0.11 l./min. (This was the rate when the volume of the suspension was allowed to fall to 60% of its original value, in order to reduce the time required for washing free of electrolyte.) Fresh methanol was added continuously to the reservoir to maintain the volume of suspension.

By this method the suspension was washed free of sodium chloride in 1.5 hr., using 8 l. of methanol for maintaining constant volume in the reservoir.

*Example 4*

A 2 l. sample of broth from Venturicidin fermentation was circulated through a nylon hose 1.27 cm. in diameter and 46.5 cm. in length. The average velocity gradient was maintained at about 2000 sec.$^{-1}$, despite the circulation rate of 1.7 l./min., by compressing the hose to a gap of 9.08 cm. between ribbed duralumin plates. The inlet pressure was 2.4 kg./sq. cm.

Clear filtrate was obtained after 20 min., at a steady rate of 5 ml./min.

*Example 5*

2.5 l. of sisal slurry were circulated through the apparatus described in Example 4, with a setting of 0.25 cm. between the plates. The average velocity gradient was then about 1000 sec.$^{-1}$, using a circulation rate of 1.7 l./min. and an inlet pressure of 2.65 kg./sq. cm. A clear filtrate was obtained after a few minutes, at a steady rate of 6 ml./min.

We claim:

1. A method of purifying solid particles suspended in liquid medium comprising a solvent for the impurities, which comprises initially passing the suspension over a porous surface at a predetermined rapid rate of flow such that a portion only of said liquid medium passing over the porous surface passes therethrough, whereby said portion is separated from solid particles carried thereby and the separated solid particles are deposited and maintained on said surface in the form of a thin pervious layer, the remainder of said liquid medium and solid particles carried thereby passing completely across said porous surface, and then continuing to pass the remainder of said liquid medium and solid particles over said porous surface at a rate sufficiently rapid to maintain said thin pervious layer thereon, and to prevent the formation of a layer of said solid particles on said porous surface sufficiently thick so as to be impervious to the passage therethrough of said liquid medium, whereby a portion of said liquid medium continues to pass through said thin pervious layer and said porous surface thereby washing and purifying the separated particles forming said pervious layer.

2. A method according to claim 1 in which the suspension passes over one side of said porous surface and is maintained under a pressure greater than the pressure prevailing on the other uncoated side of said porous surface.

3. A method according to claim 1 in which the solid particles are particles having a tendency to cake.

4. A method according to claim 1 in which the solid particles are finely divided.

5. A method according to claim 4 in which the solid particles are particles of a clay-like material.

6. A method according to claim 4 in which the solid particles are particles of a jelly-like material.

7. A method according to claim 6 in which the solid particles are particles of hydrated alumina.

8. A method according to claim 1 in which the liquid medium comprises water.

9. A method according to claim 1 in which the liquid medium comprises at least one member selected from the group consisting of an alcohol, ketone, ether, ester and hydrocarbon.

10. A method according to claim 1 in which the liquid medium carrying the solid particles is continuously recycled over the porous surface until the desired degree of purification is effected, the volume of liquid medium being maintained substantially constant by addition of fresh liquid medium.

11. A method according to claim 1 in which the porous surface is in the form of a porous tube open at both ends and the thin layer of the separated particles is maintained on a wall of the tube.

12. A method according to claim 11 in which the suspension passes over the inner wall of said tube and the suspension is maintained under a pressure greater than the pressure prevailing at the outer wall of said tube.

13. A method according to claim 11 in which the solid particles are finely divided.

14. A method according to claim 11 in which the liquid medium comprises water.

15. A method according to claim 11 in which the liquid medium comprises at least one member selected from the group consisting of an alcohol, ketone, ether and hydrocarbon.

16. A method according to claim 11 in which the liquid medium carrying the solid particles is continuously recycled through the porous tube until the desired degree of purification is effected, the volume of liquid medium being maintained substantially constant by addition of fresh liquid medium.

17. A method according to claim 13 in which the solid particles are of a material which tends to form a relatively impervious barrier to the flow of liquid therethrough.

18. A method according to claim 17 in which the solid particles are particles of one of a clay-like and a jelly-like material.

19. A method according to claim 18 in which the solid particles are particles of hydrated alumina.

20. A method of separating a liquid medium from solid particles suspended in said liquid medium which comprises initially passing the suspension over a porous surface at a predetermined rapid rate of flow such that a portion only of said liquid medium passing over the porous surface passes therethrough, whereby said portion is separated from solid particles carried thereby and the separated solid particles are deposited and maintained on said surface in the form of a thin pervious layer, the remainder of said liquid medium and solid particles carried thereby passing completely across said porous surface, and then continuing to pass the remainder of said liquid medium and solid particles over said porous surface at a rate sufficiently rapid to maintain said pervious layer thereon, and to prevent the formation of a layer of said solid particles on said porous surface sufficiently thick so as to be impervious to the passage therethrough of said liquid medium, whereby a portion of said liquid medium continues to pass through said thin pervious layer and said porous surface, and collecting the liquid medium which passes through the pervious layer of solid particles and the porous surface.

21. A method according to claim 20 in which the liquid medium carrying the solid particles is continuously recycled over the porous surface, without the further addition of liquid to said liquid medium, until the desired concentration of liquid medium to solid particles is achieved.

References Cited

UNITED STATES PATENTS

| | | | |
|---|---|---|---|
| 1,754,432 | 4/1930 | Nathan | 210—75 |
| 1,876,439 | 9/1932 | Whaley | 210—433 |
| 2,100,149 | 11/1937 | Qviller | 210—75 |
| 2,822,091 | 2/1958 | Martine | 210—75 |
| 3,138,551 | 6/1964 | Jones | 210—75 |
| 3,190,450 | 6/1965 | Stoller et al. | 210—179 |
| 3,214,369 | 10/1965 | Felix | 210—24 |

JOSEPH SCOVRONEK, *Acting Primary Examiner.*

MORRIS O. WOLK, E. G. WHITBY,
*Assistant Examiners.*